Feb. 21, 1956 W. H. PETERSON 2,735,517
VEHICLE FLOOR
Filed Dec. 13, 1952 2 Sheets-Sheet 1

Inventor
William H. Peterson
By Wayne Morris Russell
Attorney

Feb. 21, 1956
W. H. PETERSON
2,735,517
VEHICLE FLOOR
Filed Dec. 13, 1952
2 Sheets-Sheet 2
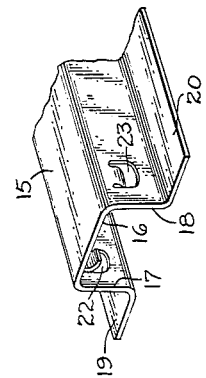
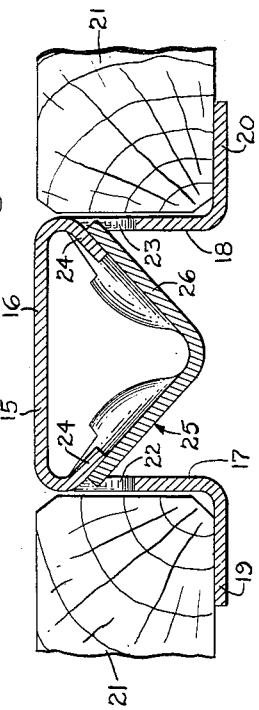
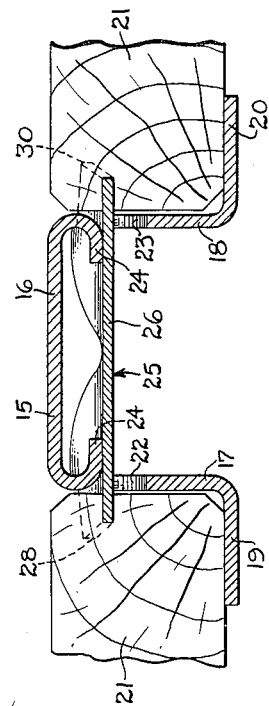
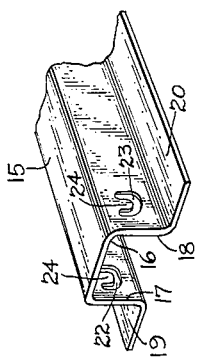
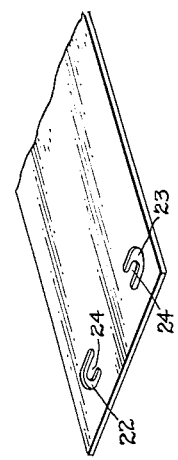
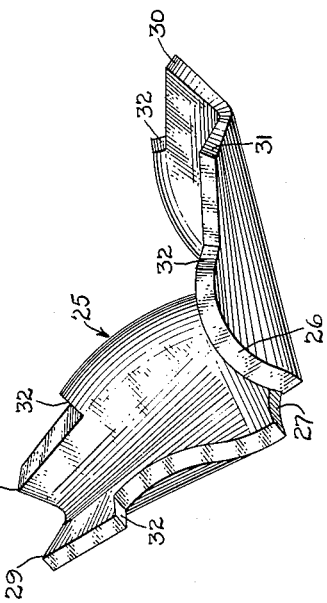
Inventor
William H. Peterson
By Wayne Morris Russell
Attorney

United States Patent Office 2,735,517
Patented Feb. 21, 1956

2,735,517

VEHICLE FLOOR

William H. Peterson, Homewood, Ill., assignor to Pullman-Standard Car Manufacturing Company, Chicago, Ill., a corporation of Delaware Application December 13, 1952, Serial No. 325,776

8 Claims. (Cl. 189—34)

This invention relates to vehicle floors and is primarily concerned with a novel means of fastening alternate metal members and wooden boards together in forming the floor of a vehicle. The instant invention is an improvement over applicant's vehicle floor forming the subject matter of Patent No. 2,692,032 issued October 19, 1954.

The principal object of the invention is to provide a novel means of fastening alternate metal members and wooden boards together in forming the floor of a vehicle.

Another object of the invention is to provide in a vehicle floor made up of alternate metal members and wooden boards wherein each member has a pair of side walls with opposed openings, a bendable tab extending from the opening in each side wall projecting toward each other with a bent floor clip extending between the pair of side walls on each member and positioned in the openings in parallel abutting relation with the respective pairs of tabs, the tabs bending with the clip as the clip is driven from a bent position to a straight position into the adjacent boards.

A more specific object of the invention is to provide in a vehicle floor made up of alternate hat-shaped metal members and wooden boards wherein each member has a pair of side walls, opposed U-shaped slots in the side walls on each member and a bendable tab extending from the slot in each side wall and projecting toward the other and disposed at an angle of approximately 45° with the side wall and a bent floor clip extending between the side walls and positioned in the slots against the tabs, the tabs bending with the clip as the clip is driven from bent position to a straight position into the adjacent boards until they are in a plane parallel to a plane passing through the clip when in the driven or straight position.

An important object of the invention is to provide a novel method of forming a vehicle metal floor member.

A further object is to provide a novel method of forming a vehicle metal floor member comprising the steps of forming a pair of spaced opposed U-shaped slots in a flat sheet of metal resulting in a tab being formed in each slot and forming the flat sheet of metal into a hat-shaped section and bending the tabs toward each other.

The foregoing and other objects of the invention are attained by the construction and arrangement illustrated in the accompanying drawings wherein—

Fig. 3 is a cross sectional view of a portion of the floor showing the position of the floor clip and tabs before the floor clip is driven into the wooden boards;

Fig. 4 is a cross sectional view of a portion of the floor showing the position of the floor clip and tabs after the floor clip is driven into the wooden boards;

Fig. 5 is a perspective view of the floor clip;

Fig. 6 is a perspective view of a portion of a flat sheet of metal showing the U-shaped slots therein;

Fig. 7 is a perspective view of the structure shown in Fig. 6 after it has been formed into a hat-shaped section; and Fig. 8 is a perspective view of the structure shown in Fig. 7 but showing the tabs bent toward each other.

Figure 1:
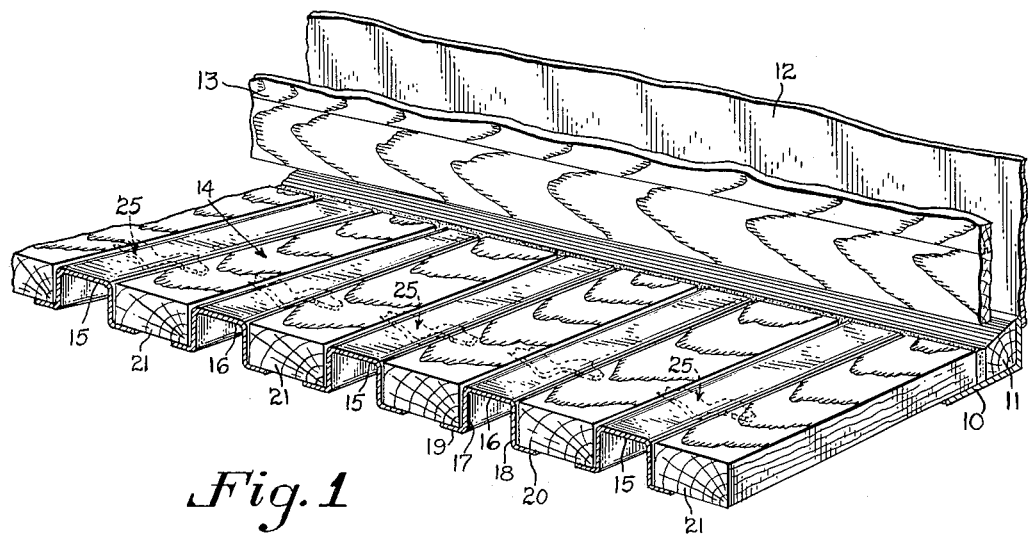
Fig. 1 is a perspective view of a portion of a floor and a portion of a side wall of a railway freight car.
Figure 2:
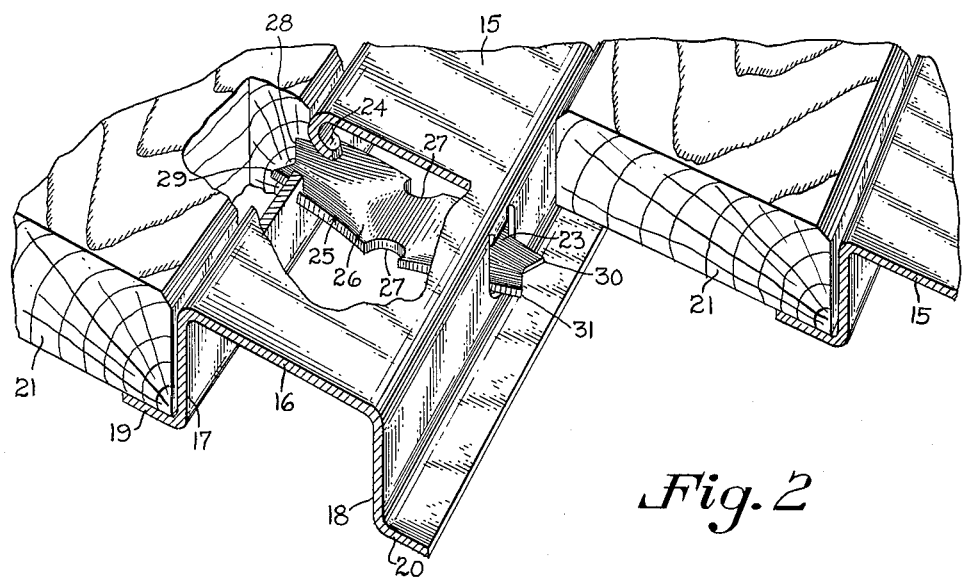
Fig. 2 is an enlarged perspective view of the floor with the floor being broken away to show a floor clip securing a wooden board to a metal member.

The invention proposes a novel means of securing alternating wooden boards and metal members together in forming the floor of a vehicle. Each member has a pair of side walls and the side walls are provided with opposed slots. A bendable tab extends from the bounding wall of the slot in each side wall and projects toward each other. A bent floor clip is adapted to extend between the side walls on each member and is positioned in the slots in parallel abutting relation with the tabs on the side walls. The tabs bend with the clip as the clip is driven from bent position to a straight position into the adjacent boards. Thus, as the compressive forces on the wood under the clip ends tends to increase enough to make driving of the clip difficult, the tabs bend and limit the resistance to the driving of the clips.

The invention further proposes a method of forming a floor member which comprises the steps of forming a pair of spaced opposed U-shaped slots in a flat sheet of metal resulting in a tab being formed in each slot. Forming the flat sheet of metal into a hat-shaped section having a pair of side walls so that each slot is disposed in one of the side walls after which the tabs are bent toward each other.

In the drawings, 10 designates a side sill of a railway box car. A wood filler 11 is positioned on the side sill 10 and the outside sheathing 12 of the side wall is secured to the side sill and the side wall lining 13 is spaced from the outside sheathing. A floor 14 is seated upon the side sill 10 and comprises a plurality of hat-shaped elongated metal members 15 arranged in side by side spaced relation and extending across the width of the car. Each member 15 has a web 16 and a pair of side walls 17 and 18 which are integral with the web and depend therefrom and flanges 19 and 20 are integral with their respective side walls. Wooden boards 21 are arranged in alternating relation with the members 15 and are positioned upon the flanges 20 and 19 of adjacent pairs of members and extend across the width of the car and are positioned upon the side sills 10.

The side walls 17 and 18 of each member 15 are provided with U-shaped slots 22 and 23 respectively and the slot in one side wall of a member is in alignment with the slot in the other side wall of the same member. A bendable tab 24 extends from the boundary wall of the slots 22 and 23 in the side walls 17 and 18 respectively of each member 15 and the tabs on the same member project toward each other and are disposed at an angle of approximately 45° with respect to a plane passing through the side wall to which the respective tab is secured as best shown in Fig. 3. A floor clip 25 extends between the side walls 17 and 18 on each member 15 and is positioned in the slots 22 and 23, and is adapted to be driven into the adjacent pair of boards 21.

Each of the floor clips 25 has its center portion flat and has its remaining portions of a V-shape in transverse cross section, that is, the floor clip has its center portion of a flat cross section, and from the center portion to each end of the floor clip, the floor clip is of a V-shape in transverse cross section. The ends of the floor clip 25 are cut away to provide a body 26, and the sides of the floor clip are cut away at the center or midway the ends of the body to provide recesses 27. The cut away ends of the floor clip 25 provide a first pair of projections 28 and 29 on one end of the body 26 which have the combined dimensions or length or extent of their bases less than the dimension or width of said one end of the body. The cut away ends of the floor clip 25 also provide a second pair of projections 30 and 31 on the other end of the body 26 which have the combined dimensions or length or extent of their bases less than the dimension or width of said other end of the body 26. The first pair of projections 28 and 29 and the second pair of projections 30 and 31 penetrate into the adjacent boards 21, and the ends of the body 26 are of a greater dimension or width than the dimension or size of either of the slots 22 and 23, and the free edges on each of the ends of the body 26 adjacent the sides of the body form shoulders 32 which abut against the inner face of the adjacent side wall 17 or 18.

To apply the floor clip 25, which is bent transversely of itself at its center at the recesses 27, it is positioned between the pair of side walls 17 and 18 of a member 15, and one pair of projections, say 28 and 29, are inserted in one of the slots in the side wall of the member and the other pair of projections 30 and 31 are inserted into the opposed slot 23 in the side wall 18 of the same member. The floor clip 25 is positioned in parallel abutting relation with the tabs 24 on each member 15 as best shown in Fig. 3. Then the floor clip 25 is struck at its center, with a suitable tool such as an air hammer, which causes it to straighten out and to penetrate into the adjacent boards 21. As the floor clip 25 is driven straight, the pair of projections 28 and 29 and the pair of projections 30 and 31 pass through the slots 22 and 23 and penetrate into the respectively adjacent boards 21 with an angular downward motion, forcing the boards down against the flanges 19 and 20. As the compressive forces on the wood under the ends of the floor clip 25 tends to increase enough to make driving of the clip difficult, the tabs 24 bend and thus limit the resistance to the driving of the floor clip. That is, the tabs 24 bend with the floor clip 25 as the floor clip is driven from its bent position to a straight position into the adjacent boards 21 until they are in a plane parallel to a plane passing through the floor clip when in the driven or straight position as best shown in Figs. 3 and 4. The tabs 24 form a yielding fulcrum about which the penetrating ends of the floor clip 25 rotate as the floor clip is being driven into the wooden boards 21, or stated in another way, the tabs act as yielding fulcrum by which the floor clip obtains its angular downward motion while penetrating the boards 21. The shoulder 32 engage the inner faces of the side walls 17 and 18 and limit the amount that the pair of projections 28 and 29 or the pair of projections 30 and 31 can penetrate into the wooden boards 21, and the shoulders also insure that the amount that the pair of projections 28 and 29 penetrate into the adjacent board will be equal to the amount the pair of projections 30 and 31 penetrate into the adjacent board. The floor clips 25 may be removed from the boards 21 and the members 15 by inserting a suitable tool, such as a pry bar, between the floor clip and the inner face of the web 16 and prying the floor clip out.

The method of forming the floor member 15 comprises the following steps in the order named: A pair of spaced opposed U-shaped slots 22 and 23 are punched in a flat sheet of metal resulting in a tab 24 being formed in each slot as shown in Fig. 6. The flat sheet of metal is formed into a hat-shaped section so that each slot is disposed in one of the side walls 17 or 18 as shown in Fig. 7. The tabs 24 are bent toward each other to an angle of approximately 45° with respect to a plane passing through the side wall to which the respective tab is secured as shown in Fig. 8.

The floor clips are arranged in rows which extend longitudinally of the car. In practice, two rows of floor clips would be provided on each side of the center sill. This would make a total of four rows of clips for a complete railway car floor.

Where the tabs in the slots of a corrugated metal member are fixed, that is, the tabs formed unyielding fulcrums about which the penetrating ends of floor clips rotate as the clip is driven into the wooden boards causes angular downward motion of the clip ends while the clip is being driven, and forces the boards between corrugated metal members down tightly in place. The wood under the clip ends is therefore subjected to very high compressive forces which resist the action of driving the clip, and cause considerable crushing of the wood fibers. With the harder woods such as oak, the resistance to driving clips is high enough to make application exceedingly difficult and the compressive forces are much more than is necessary to hold the board in place. Also, if while driving, the clip is struck at an angle other than the vertical, the clip can shift in the slot sufficiently to cause interference between the tab and the clip shoulder, resulting in an incomplete penetration of the clip into the board.

These disadvantages are eliminated by the present invention where, as the compressive forces on the wood under the clip ends tends to increase enough to make driving of the clip difficult, the tabs bend and thus limit the resistance to the driving of the clips. The tabs are narrow in width and cannot interfere with the clip shoulders even though the clips might be struck at oblique angles, tending to shift them in the slots. The method of forming the metal floor member is also very simple and economical enabling mass production of these members.

From the foregoing it will be seen that there has been provided bendable tabs extending from the openings in the side walls of the metal members that bend with the floor clip as it is driven into adjacent wooden boards resulting in less compressive force on the wooden boards and enabling easier driving of the clip and novel method of forming a metal floor member.

What is claimed is:

1. A vehicle floor comprising a plurality of elongated metal members arranged in side by side spaced relation, each of the members having a pair of side walls with wooden boards alternating between the members, each of the side walls of the members being provided with an opening, a bendable tab extending from the bounding wall of the opening in each side wall and the tabs on the same member projecting toward each other, and a bent floor clip extending between the pair of side walls on each of the members and positioned in the openings in parallel abutting relation with the respective tabs, the tabs bending with the clip as the clip is driven from bent position to a straight position into adjacent boards.

2. A vehicle floor comprising a plurality of elongated metal members arranged in side by side spaced relation, each of the members having a pair of side walls with wooden boards alternating between the members, each of the side walls of the members being provided with an opening and the opening in one side wall of a member being in alignment with the opening in the other side wall of the same member, a bendable tab extending from the bounding wall of the opening in each side wall and the tabs on the same member projecting toward each other, and a bent floor clip extending between the side walls of each member and positioned in the openings in parallel abutting relation with the respective tabs, the tabs bending with the clip as the clip is driven from bent position to a straight position into adjacent boards until they are in a plane parallel to a plane passing through the clip when in the driven or straight position.

3. A vehicle floor comprising a plurality of elongated meal members arranged in side by side spaced relation, each of the members having a pair of side walls with wooden boards alternating between the members, each of the side walls of the members being provided with an opening and the opening in one side wall being in alignment with the opening in the other side wall of the same member, a bendable tab extending from the bounding wall of the opening in each side wall and the tabs on the same member projecting toward each other and disposed at an angle of less than 90° with respect to a plane passing through the respective side wall, and a bent floor clip extending between the side walls and positioned in the openings against the respective pair of tabs, the tabs bending with the clip as the clip is driven from bent position to a straight position into adjacent boards.

4. A vehicle floor comprising a plurality of elongated metal members arranged in side by side spaced relation, each of the members having a pair of side walls with wooden boards alternating between the members, each of the side walls of the members being provided with an opening and the opening in one side wall being in alignment with the opening in the other side wall of the same member, a bendable tab extending from the bounding wall of the opening in each side wall and the tabs on the same member projecting toward each other and disposed at an angle of approximately 45° with respect to a plane passing through the respective side wall, and a bent floor clip extending between the side walls and positioned in the openings against the respective tabs, the tabs bending with the clip as the clip is driven from bent position to a straight position into adjacent boards.

5. A vehicle floor comprising a plurality of elongated metal members arranged in side by side spaced relation, each of the members having a pair of side walls with wooden boards alternating between the members, each of the side walls of the members being provided with an opening and the opening in one side wall being in alignment with the opening in the other side wall of the same members, a bendable tab extending from the bounding wall of the opening in each side wall, the tabs on the same member projecting toward each other and disposed at an angle of approximately 45° with respect to a plane passing through the respective side wall, and a bent floor clip extending between the side walls and positioned in the openings against the respective tabs, the tabs bending with the clip as the clip is driven from bent position to a straight position into adjacent boards until they are in a plane parallel to a plane passing through the clip when in the driven or straight position.

6. A vehicle floor comprising a plurality of hat-shaped elongated metal members arranged in side by side spaced relation, each of the members having a pair of side walls with wooden boards alternating between the members, each of the side walls of the members being provided with a U-shaped slot and the slot in one side wall being in alignment with the slot in the other side wall of the same member, a bendable tab extending from the bounding wall of the slot in each side wall and the tabs on the same member projecting toward each other and disposed at an angle of approximately 45° with respect to a plane passing through the respective side wall, and a bent floor clip extending between the side walls and positioned in the slots against the respective tabs, the tabs bending with the clip as the clip is driven from bent position to a straight position into the adjacent boards until they are in a plane parallel to a plane passing through the clip when in the driven or straight position.

7. A vehicle floor comprising a plurality of hat-shaped elongated metal members arranged in side by side spaced relation, each of the members having a pair of side walls with wooden boards alternating between the members, each of the side walls of the members being provided with a U-shaped slot and the slot in one side wall being in alignment with the slot in the other side wall of the same member, a bendable tab extending from the bounding wall of the slot in each side wall and the tabs on the same member projecting toward each other and disposed at an angle of approximately 45° with respect to a plane passing through the respective side wall, and a bent floor clip extending between the side walls and positioned in the slots against the respective pair of tabs, each of the clips having its ends cut away to provide a body and a pair of projections on each end of the body having the combined dimensions of their bases less than the dimension of the end of the body, the tabs bending with the clip as the clip is driven from bent position to a straight position into adjacent boards until they are in a plane parallel to a plane passing through the clip when in the driven or straight position and the respective projections penetrating into adjacent boards.

8. A vehicle floor comprising a plurality of hat-shaped elongated metal members arranged in side by side spaced relation, each of the members having a pair of side walls with wooden boards alternating between the members, each of the side walls of the members being provided with a U-shaped slot and the slot in one side wall being in alignment with the slot in the other side wall of the same member, a bendable tab extending from the bounding wall of the slot in each said wall, the tabs on the same member projecting toward each other and disposed at an angle of approximately 45° with respect to a plane passing through the respective side wall, and a bent floor clip extending between the side walls and positioned in the slots against the respective tabs, each of the floor clips having its center portion flat and its remaining portions of a V-shape in transverse cross section and the ends of the clip being cut away to provide a body and a pair of projections on each end of the body having the combined dimensions of their bases less than the dimension of the end of the body, the tabs bending with the clip as the clip is driven from bent position to a straight position into adjacent boards until they are in a plane parallel to a plane passing through the clip when in the driven or straight position and the projections penetrating into adjacent boards, and the free edges on the ends of the body adjacent the sides of the body forming shoulders which abut against the inner face of the adjacent side wall.

References Cited in the file of this patent

UNITED STATES PATENTS

| | | |
|---|---|---|
| 1,848,604 | Cerny | Mar. 8, 1932 |
| 1,941,967 | Bell | Jan. 2, 1934 |
| 2,189,126 | Bonsall | Feb. 6, 1940 |
| 2,233,719 | Vanderveld | Mar. 4, 1941 |
| 2,244,847 | Oeckl et al. | June 10, 1941 |
| 2,256,037 | Reid | Sept. 16, 1941 |
| 2,307,149 | Milz et al. | Jan. 5, 1943 |
| 2,313,167 | Nystrom | Mar. 9, 1943 |
| 2,692,032 | Peterson | Oct. 19, 1954 |